(12) United States Patent
Brown et al.

(10) Patent No.: US 12,286,382 B2
(45) Date of Patent: Apr. 29, 2025

(54) GRANULES

(71) Applicant: 3M INNOVATIVE PROPERTIES COMPANY, St. Paul, MN (US)

(72) Inventors: Robert P. Brown, Hudson, WI (US); Taisiya Skorina, Woodbury, MN (US); Rebecca L. A. Everman, Falcon Heights, MN (US); Jean A Tangeman, Minneapolis, MN (US); Kenton D. Budd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 272 days.

(21) Appl. No.: 16/620,087

(22) PCT Filed: Jun. 13, 2018

(86) PCT No.: PCT/IB2018/054320
§ 371 (c)(1),
(2) Date: Dec. 6, 2019

(87) PCT Pub. No.: WO2018/234942
PCT Pub. Date: Dec. 27, 2018

(65) Prior Publication Data
US 2020/0189986 A1 Jun. 18, 2020

Related U.S. Application Data (60) Provisional application No. 62/521,640, filed on Jun. 19, 2017.

(51) Int. Cl.
*C04B 41/87* (2006.01)
*C04B 35/10* (2006.01)
(Continued)

(52) U.S. Cl.
CPC .............. *C04B 41/87* (2013.01); *C04B 35/10* (2013.01); *C04B 35/46* (2013.01); *C04B 40/029* (2013.01);
(Continued)

(58) Field of Classification Search
CPC ......... C04B 41/87; C04B 35/10; C04B 35/46; C04B 40/029; C04B 2111/00586;
(Continued)

(56) References Cited

U.S. PATENT DOCUMENTS 7,388,063 B2  6/2008  Zanghellini
8,142,531 B2  3/2012  Adefris
(Continued)

FOREIGN PATENT DOCUMENTS

CA  2545903  11/2006
CA  2800585  6/2013
(Continued)

OTHER PUBLICATIONS

Levinson, "A novel technique for the production of cool colored concrete tile and asphalt shingle roofing products"; Solar Energy Materials & Solar Cells, 2010, vol. 94, pp. 946-954.
(Continued)

*Primary Examiner* — Nathan L Van Sell (57) ABSTRACT

Plurality of granules comprising a ceramic core having an outer surface and a shell on and surrounding the core, wherein the shell comprises ceramic particles bound together with an inorganic binder, the inorganic binder comprising reaction product of at least alkali silicate and hardener, wherein the ceramic particles are present as greater than 50 percent by weight of the shell of the respective granule, based on the total weight of the shell of the respective granule, wherein the shell of each granule has a total porosity in a range from greater than 0 to 60 percent
(Continued)

by volume, based on the total volume of the shell of the respective granule, wherein the shell of each granule has a volume of at least 40 volume percent, based on the total volume of the respective granule, and wherein the granules have a minimum Total Solar Reflectance of at least 0.7. The granules are useful, for example, as roofing granules.

18 Claims, 3 Drawing Sheets

(51) Int. Cl.
    *C04B 35/46*     (2006.01)
    *C04B 40/02*     (2006.01)
    *C04B 111/00*     (2006.01)
    *C04B 111/80*     (2006.01)
    *E04D 7/00*     (2006.01)

(52) U.S. Cl.
    CPC .... *E04D 7/005* (2013.01); *C04B 2111/00586* (2013.01); *C04B 2111/80* (2013.01)

(58) Field of Classification Search
    CPC ........... C04B 2111/80; C04B 35/62802; C04B 35/62892; C04B 35/62897; C04B 35/6316; E04D 7/005; B01J 13/206; B01J 13/14
    See application file for complete search history.

(56) References Cited

U.S. PATENT DOCUMENTS

| | | |
|---|---|---|
| 2005/0072114 A1 | 4/2005 | Shiao |
| 2008/0241472 A1 | 10/2008 | Shiao |
| 2010/0151199 A1 | 6/2010 | Shiao |
| 2010/0203336 A1 | 8/2010 | Shiao |
| 2011/0027533 A1* | 2/2011 | Kennedy ................... E04D 1/00 428/143 |
| 2013/0004713 A1 | 1/2013 | Zhou |
| 2014/0248467 A1 | 9/2014 | Shiao |

FOREIGN PATENT DOCUMENTS

| | | |
|---|---|---|
| CA | 2871737 | 11/2013 |
| CA | 2876893 | 12/2013 |
| WO | WO 2008-147971 | 12/2008 |
| WO | WO 2008-147972 | 12/2008 |
| WO | WO 2009-145968 | 12/2009 |
| WO | WO 2010-091326 | 8/2010 |
| WO | WO 2013-192336 | 12/2013 |
| WO | WO 2014-042987 | 3/2014 |
| WO | WO 2014-042988 | 3/2014 |
| WO | WO 2014-043212 | 3/2014 |
| WO | WO 2015-112590 | 7/2015 |
| WO | WO 2015-157612 | 10/2015 |
| WO | WO 2015-157615 | 10/2015 |
| WO | WO 2017-200843 | 11/2017 |
| WO | WO 2017-200844 | 11/2017 |

OTHER PUBLICATIONS

International Search report for PCT International Application No. PCT/IB2018/054320 mailed on Sep. 18, 2018, 5 pages.

* cited by examiner

GRANULES

CROSS REFERENCE TO RELATED APPLICATIONS

This application is a national stage filing under 35 U.S.C. 371 of PCT/IB2018/054320, filed Jun. 13, 2018, which claims the benefit of U.S. Provisional Application No. 62/521,640 filed Jun. 19, 2017, the disclosure of which is incorporated by reference in its/their entirety herein.

BACKGROUND

Conventional roofing granules consist of a core baserock of dacite, nepheline syenite, rhyolite, andesite, etc., coated with at least one layer of pigment-containing coating. A typical coating is composed of sodium silicate mixed with raw clay and a pigmenting oxide. Energy efficient shingles are designed to have improved solar reflectivity. Titania pigmented standard white granules are known, but total reflectance of these pigments is limited by absorbance of the baserock (as conventional pigment layers do not completely "hide" the underlying base), and by absorbance in the binder system by components such as the clay.

SUMMARY

In one aspect, the present disclosure describes a plurality of granules comprising a ceramic (i.e., comprises at least one ceramic) core having an outer surface and a shell on and surrounding the core, wherein the shell comprises ceramic particles bound together with an inorganic binder, the inorganic binder comprising reaction product of at least alkali silicate and hardener (in some embodiments further comprising alkali silicate itself), wherein the ceramic particles are present as greater than 50 (in some embodiments, greater than 55, 60, 65, 70, 75, 80, or even greater than 85; in some embodiments, in a range from greater than 50 to 85, or even greater than 60 to 85) percent by weight of the shell of the respective granule, based on the total weight of the shell of the respective granule, wherein the shell of each granule has a total porosity in a range from greater than 0 to 60 (in some embodiments, in a range from 5 to 60, 20 to 60, 5 to 50, 20 to 50, or even 20 to 40) percent by volume, based on the total volume of the shell of the respective granule, wherein the shell of each granule has a volume of at least 40 (in some embodiments, greater than 45, 50, 55, 60, 65, 70, 75, 80, or even greater than 85; in some embodiments, in a range from greater than 50 to 85, or even greater than 60 to 85) volume percent, based on the total volume of the respective granule, and wherein the granules have a minimum Total Solar Reflectance (TSR) of at least 0.7 (in some embodiments, of at least 0.75, or even at least 0.8).

In this application:
"amorphous" refers to material that lacks any long-range crystal structure, as determined by the X-ray diffraction technique described in the Examples;
"ceramic" refers to a metal (including silicon) oxide, which may include at least one of a carbon or a nitrogen, in at least one of an amorphous, crystalline, or glass-ceramic form;
"solid ceramic core" refers to a ceramic that is substantially solid (i.e., has no more than 10 percent porosity, based on the total volume of the core);
"functional additive" refers to a material that substantially changes at least one property (e.g., durability and resistance to weathering) of a granule when present in an amount not greater than 10 percent by weight of the granule;
"glass" refers to amorphous material exhibiting a glass transition temperature;
"hardener" refers to a material that initiates and/or enhances hardening of an aqueous silicate solution; hardening implies polycondensation of dissolved silica into three-dimensional Si—O—Si(Al, P) bond network and/or crystallization of new phases; in some embodiments, the granules comprise excess hardener;
"mineral" refers to a solid inorganic material of natural occurrence; and
"partially crystallized" refers to material containing a fraction of material characterized by long range order.

In another aspect, the present disclosure describes a method of making a plurality of granules described herein, the method comprising:
providing a plurality of ceramic cores;
coating each of the ceramic cores with a shell precursor, wherein the shell precursor comprises an aqueous dispersion comprising ceramic particles, alkali silicate precursor, and hardener precursor; and
curing the coated aqueous dispersion to provide the plurality of granules.

Granules described herein are useful, for example, as roofing granules.

Advantages of some embodiments of granules described herein may include high TSR (i.e., at least 70%) with low to moderate cost (i.e., $200 to $2000 per ton), low dust (i.e., comparable to conventional roofing granules), low staining (i.e., stain test values less than 10), and good mechanical properties (i.e., tumble toughness values of at least 50).

DETAILED DESCRIPTION

The core has a diameter of at least 200 micrometers (in some embodiments, at least 250 micrometers, 300 micrometers, 400 micrometers, 500, micrometers, 750 micrometers, 1 mm, 1.5, mm, or even 2 mm; in some embodiments, in a range from 200 micrometers to 2 mm, 300 micrometers to 1.5 mm, 400 micrometers to 1 mm, 500 micrometers to 1 mm, 300 micrometers to 1 mm, 300 micrometers to 2 mm, or even 1 mm to 2 mm).

In some embodiments, the core comprises at least one of a silicate (e.g., silicate rock) (e.g., aluminosilicate (including aluminosilicate rock) and alkali aluminosilicate (including alkali aluminosilicate rock)), aluminate (including aluminate rock) (e.g., bauxite), or silica. Typically, the core is at least one of a crystalline, a glass, or a glass-ceramic. Such materials can be obtained from conventional roofing granule sources known in the art. Further crystalline, glass, or glass-ceramic materials can be made using techniques known in the art.

In some embodiments, the core has no more than 10, 5, 4, 3, 2, 1, or even has zero percent porosity, based on the total volume of the core.

Typically, the shell has a thickness of at least 50 (in some embodiments, at least 75, 100, 150, 200, 250, 300, 350, 400, 500, or even 750; in some embodiments, in a range from 50 to 750, 100 to 500, or even 200 to 500) micrometers.

In some embodiments, the shell of each granule collectively comprises at least 80 (in some embodiments, at least 85, 90, or even at least 95; in some embodiments, in a range from 80 to 95) percent by weight collectively of the ceramic particles, alkali silicate, and reaction product of the alkali silicate and the hardener, based on the total weight of the shell of the respective granule.

In some embodiments, the shell comprises a first and second concentric layers, with the first layer being closer to the core than the second layer. In some embodiments, the first layer has a thickness of at least 50 (in some embodiments, at least 75, 100, 150, 200, 250, 300, 350, 400, 500, or even 750; in some embodiments, in a range from 50 to 750, 100 to 500, or even 200 to 500) micrometers. In some embodiments, the second layer has a thickness at least 1 (in some embodiments, at least 2, 3, 4, 5, 10, 15, 20, 25, 50, 75, 100, 150, 200, 250, 300, 350, 400, 500, or even 750; in some embodiments, in a range from 1 to 750, 1 to 500, 1 to 250, 1 to 100, 50 to 750, 100 to 750, 200 to 750, 50 to 500, 100 to 500, or even 200 to 500) micrometer.

In some embodiments, the first shell layer has a first specific surface area, wherein the second shell layer has a second specific surface area, and wherein the first specific surface area is greater than the second specific surface area (in some embodiments, the first specific surface area is at least 2 (in some embodiments, a least 3, 4, 5, or even at least 10) times greater than the second specific surface area). In some embodiments, the second surface area is not greater than 2 (in some embodiments, not greater than 1.5, 1, 0.9, 0.8, 0.7, 0.6, 0.5, 0.4, 0.3, or even not greater than 0.2; in some embodiments, in a range from 0.2 to 2, 0.3 to 2, 0.4 to 2, 0.5 to 2, or even 1 to 2) m$^2$/grams. In some embodiments, the first surface area is not greater than 10 (in some embodiments, not greater than 9, 8, 7, 6, 5, 4, 3, or even not greater than 2; in some embodiments, in a range from 2 to 10, 3 to 10, 4 to 10, or even 5 to 10) m$^2$/grams.

Suitable alkali silicates include cesium silicate, lithium silicate, a potassium silicate, or a sodium silicate. Exemplary alkali silicates are commercially available, for example, from PQ Corporation, Malvern, PA. In some embodiments, the inorganic binder further comprises reaction product of amorphous aluminosilicate hardener.

In some embodiments, the hardener is at least one an aluminum phosphate, an aluminosilicate, a cryolite, a calcium salt (e.g., CaCl$_2$), or a calcium silicate. In some embodiments, the hardener may further comprise zinc borate. In some embodiments, the hardener is amorphous. Exemplary hardeners are commercially available, for example, from commercial sources such as Budenheim Inc., Budenheim, Germany, and Solvay Fluorides, LLC, Houston, TX.

In some embodiments, the inorganic binder is present as at least 5 (in some embodiments, at least 10, 15, 20, 25, 30, 35, 40, or 45, or even up to 50; in some embodiments, in a range from 5 to 50, 10 to 50, or even 25 to 50) percent by weight of the shell of each granule, based on the total weight of the shell of the respective granule.

In some embodiments, the ceramic particles comprise at least one component with Total Solar Reflectance (as determined by the Total Solar Reflectance Test described in the Examples) of at least 0.7. Such exemplary ceramic particles include aluminum hydroxide, metal or metalloid oxide (e.g., silica (e.g., crystoballite, quartz, etc.), an aluminate (e.g., alumina, mullite, etc.), a titanate (e.g., titania), and zirconia), a silicate glass (e.g., soda-lime-silica glass, a borosilicate glass), porcelain, calcite, or marble. In some embodiments, the ceramic particles comprise mineral. Exemplary sources of ceramic particles include Vanderbilt Minerals, LLC, Norwalk, CT; Dadco, Lausanne, Switzerland; American Talc Company, Allamoore, TX; Imerys, Inc., Cockeysville, MD; and Cristal Metals, Woodridge, IL.

In some embodiments, the ceramic particles of each granule comprise no more than 10 (in some embodiments, no greater than 5, 4, 3, 2, 1, or even zero) percent by weight pure TiO$_2$, based on the total weight of either the core or granule for the respective core or granule. In some embodiments, the ceramic particles of each granule comprise no more than 10 (in some embodiments, no greater than 5, 4, 3, 2, 1, or even zero) percent by weight TiO$_2$, based on the total weight of the granule for either the core or granule for the respective core or granule. In some embodiments, the ceramic particles of each granule comprise no more than 10 (in some embodiments, no greater than 5, 4, 3, 2, 1, or even zero) percent by weight pure Al$_2$O$_3$, based on the total weight of the granule for either the core or granule for the respective core or granule.

In some embodiments, the ceramic particles have an average size in a range from 200 nanometers to 200 micrometers (in some embodiments, 200 nanometers to 100 micrometers, 250 nanometers to 50 micrometers, 500 nanometers to 20 micrometers, 1 micrometers to 10 micrometers, or even 2 micrometers to 20 micrometers. In some embodiments, the ceramic particles have a continuous or bimodal distribution of sizes. In some embodiments, the ceramic particles may have a broad distribution of particle sizes, while in others, it may have a narrow distribution of particle sizes.

In some embodiments, the ceramic particles each have a longest dimension, wherein the granules each have a longest dimension, and wherein the longest dimension of each ceramic particle, for a given granule, is no greater than 10% (in some embodiments, no greater than 20%) of the diameter of said given granule.

In some embodiments, the granules further comprise at least one of a functional additive (e.g., rheology modifier, durability modifier, and fluxing agent), organic binder, or pigment. Exemplary rheology modifiers include surfactants. Exemplary durability modifiers include nanosilica, pyrogenic ("fumed") silica, and silica fume, which are available, for example, from Evonik Industries, Essen, Germany.

Exemplary fluxing agents include borax, which is available, for example, from Rio Tinto Minerals, Boron, CA. Exemplary organic binders include dextrin and carboxymethylcellulose, which are available, for example, from Dow Chemical Company, Midland, MI.

Embodiments of granules described herein can be made, for example, by a method comprising:
  providing a plurality of ceramic cores;
  coating each of the ceramic cores with a shell precursor, wherein the shell precursor comprises an aqueous dispersion comprising ceramic particles, alkali silicate precursor, and hardener precursor; and
  curing the coated aqueous dispersion to provide the plurality of granules. In some embodiments, the curing is conducted at least in part at a temperature in a range from 40° C. to 500° C., 50° C. to 450° C., 50° C. to 350° C., 50° C. to 250° C., 50° C. to 200° C., 50° C.

to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

The shell can comprise more than one layer. A first layer can be applied by any of a variety of methods for forming a shell. For example, in some embodiments of the method, coating the ceramic core with the shell comprises fluidized bed coating. In some embodiments, the fluidized bed coating comprises fluidizing ceramic cores, heating the bed of fluidized cores, and continuously feeding the aqueous dispersion into the fluidized bed. In some embodiments of the method, the feeding is over a period of time in a range from 5 minutes to 500 minutes. In some embodiments of the method, the heating is at a temperature in a range from 50° C. to 200° C. If desired, additional layers can be applied sequentially to the existing core plus shell(s) by any methods used to form a shell.

In some embodiments of the method, water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

In some embodiments, the granules have sizes in a range from 200 micrometers to 5 millimeters (in some embodiments, 200 micrometers to 2 millimeters, 300 micrometers to 1 millimeter, 400 micrometers to 1 millimeter; 500 micrometers to 2 millimeters; or even 1 millimeters to 5 millimeters).

In some embodiments, the inorganic binder is amorphous. In some embodiments, the inorganic binder is partially crystallized.

In some embodiments, the granules have a density in a range from 0.5 g/cm$^3$ to 3 g/cm$^3$.

Shaped granules can be formed, for example, by using shaped cores. The granules may be in any of a variety of shapes, including cubes, truncated cubes, pyramids, truncated pyramids, triangles, tetrahedra, spheres, hemispheres, and cones. In some embodiments, a granule can have a first face and a second face separated by a thickness. In some embodiments, such granules further comprise at least one of a straight or sloping wall.

In some embodiments, granules described herein have a Tumble Toughness Value, after immersion in water for two months at 20° C.±2° C., of at least 40, 45, 50, 55, 60, 65, 70, 75, 80, 85 or even at least 90.

In some embodiments, the granules have a Stain Value (as determined by the Stain Value Test described in the Examples) of not greater than 15 (in some embodiments, not greater than 10, 5, 4, 3, 2, 1, or even not greater than 0.5).

In some embodiments, the granules further comprise at least one adhesion promoter (e.g., a polysiloxane). The polysiloxane can contain a hydrocarbon tail for better wetting with the hydrophobic asphalt. A siloxane bond can form, for example, between a granule surface and the polysiloxane, via condensation reaction, leaving the hydrophobic hydrocarbon tail on the granule surface. Although not wanting to be bound by theory, the transformation of the hydrophilic surface into a hydrophobic oily surface improves wetting of the granule surface by the asphalt. Exemplary polysiloxanes include "SILRES BS 60" or "SILRES BS 68" from Wacker Chemical Corporation, Adrian, MI.

In some embodiments, the granules further comprise at least one dust suppressant (e.g., an acrylic polymer comprising a quaternary ammonium moiety and a nonionic monomer). Although not wanting to be bound by theory, dust suppressant is believed to suppress dust through ionic interaction of the positively charged quaternary ammonium moiety and negatively charged dust particles. The quaternary ammonium moiety may also form, for example, an ionic bond with natural mineral. Furthermore, it may ionically bond with ionic species in asphalt, particularly polyphosphoric acid (PPA) added asphalt. Of course, other anionic species are present in asphalt, including non-PPA asphalt, to which an ionic bond may form. Accordingly, a dust suppression coating composition comprising a quaternary ammonium compound as described herein may also serve as an adhesion promoter.

In some embodiments, the dust suppression coating polymer comprises water-based polymers, such as a polyacrylate (e.g., an acrylic emulsion polymer). In some embodiments, the coating polymer is a polymer such as described in PCT Pat. Pub. Docs. WO2015157615 A1, and WO2015157612 A1, published Oct. 15, 2015, the disclosures of which are incorporated herein by reference.

Granules described herein are useful, for example, as roofing granules. For example, granules described herein can be used to make roofing material (e.g., a shingle) comprising a substrate and the granules thereon. In some embodiments, the roofing material has a Total Solar Reflectance (TSR) (as determined by the Total Solar Reflectance Test described in the Examples) of at least 60 (in some embodiments, at least 63, 65, or even at least 70) %.

Advantages of embodiments of granules described herein may include high TSR (i.e., at least 70%) with low to moderate cost (i.e., $200 to $2000 per ton), low dust (i.e., comparable to conventional roofing granules), low staining (i.e., stain test values of less than 10), and good mechanical properties (i.e., tumble toughness values of at least 50).

Exemplary Embodiments

1A. A plurality of granules comprising a ceramic core having an outer surface and a shell on and surrounding the core, wherein the shell comprises ceramic particles bound together with an inorganic binder, the inorganic binder comprising reaction product of at least alkali silicate and hardener (in some embodiments further comprising alkali silicate itself), wherein the ceramic particles are present as greater than 50 (in some embodiments, greater than 55, 60, 65, 70, 75, 80, or even greater than 85; in some embodiments, in a range from greater than 50 to 85, or even greater than 60 to 85) percent by weight of the shell of the respective granule, based on the total weight of the shell of the respective granule, wherein the shell of each granule has a total porosity in a range from greater than 0 to 60 (in some embodiments, in a range from 5 to 60, 20 to 60, 5 to 50, 20 to 50, or even 20 to 40) percent by volume, based on the total volume of the shell of the respective granule, wherein the shell of each granule has a volume of at least 40 (in some embodiments, greater than 45, 50, 55, 60, 65, 70, 75, 80, or even greater than 85; in some embodiments, in a range from greater than 50 to 85, or even greater than 60 to 85) volume percent, based on the total volume of the respective granule, and wherein the granules have a minimum Total Solar Reflectance (TSR) (as determined by the Total Solar Reflectance Test described in the Examples) of at least 0.7 (in some embodiments, of at least 0.75, or even at least 0.8).

2A. The plurality of granules of Exemplary Embodiment 1A, wherein the ceramic cores include solid ceramic cores.

3A. The plurality of granules of any preceding A Exemplary Embodiment, wherein the core has a diameter of at least 200 micrometers (in some embodiments, at least 250 micrometers, 300 micrometers, 400 micrometers, 500 micrometers, 750 micrometers, 1 mm, 1.5 mm, or even 2 mm; in some embodiments, in a range from 200 micrometers to 2 mm, 300 micrometers to 1.5 mm, 400 micrometers to 1 mm, 500 micrometers to 1 mm, 300 micrometers to 1 mm, 300 micrometers to 2 mm, or even 1 mm to 2 mm).

4A. The plurality of granules of any preceding A Exemplary Embodiment, wherein the core is at least one of a crystalline, glass, or a glass-ceramic.

5A. The plurality of granules of any preceding A Exemplary Embodiment, wherein the core comprises at least one of a silicate (e.g., silicate rock) (e.g., aluminosilicate (including aluminosilicate rock)) and alkali aluminosilicate (including alkali aluminosilicate rock), aluminate (including aluminate rock) (e.g., bauxite), or silica.

6A. The plurality of granules of any preceding A Exemplary Embodiment, wherein the shell has a thickness of at least 50 (in some embodiments, at least 75, 100, 150, 200, 250, 300, 350, 400, 500, or even 750; in some embodiments, in a range from 50 to 750, 100 to 500, or even 200 to 500) micrometers.

7A. The plurality of granules of any preceding A Exemplary Embodiment, wherein the shell of each granule collectively comprises at least 80 (in some embodiments, at least 85, 90, or even at least 95; in some embodiments, in a range from 80 to 95) percent by weight collectively of the ceramic particles, alkali silicate, and reaction product of the alkali silicate and the hardener, based on the total weight of the shell of the respective granule.

8A. The plurality of granules of any preceding A Exemplary Embodiment, wherein the ceramic particles each have a longest dimension, wherein the granules each have a longest dimension, and wherein the longest dimension of each ceramic particle for a given granule is no greater than 10% (in some embodiments, no greater than 20%) of the diameter of said given granule.

9A. The plurality of granules of any preceding A Exemplary Embodiment, wherein the ceramic particles of each granule comprises no more than 10 (in some embodiments, no greater than 5, 4, 3, 2, 1, or even zero) percent by weight pure $TiO_2$, based on the total weight of either the core or granule for the respective core or granule.

10A. The plurality of granules of any of Exemplary Embodiments 1A to 8A, wherein the ceramic particles of each granule comprise no more than 10 (in some embodiments, no greater than 5, 4, 3, 2, 1, or even zero) percent by weight $TiO_2$, based on the total weight of the granule for either the core or granule for the respective core or granule.

11A. The plurality of granules of any preceding A Exemplary Embodiment, wherein the ceramic particles of each granule comprise no more than 10 (in some embodiments, no greater than 5, 4, 3, 2, 1, or even zero) percent by weight pure $Al_2O_3$, based on the total weight of the granule for either the core or granule for the respective core or granule.

12A. The plurality of granules of any preceding A Exemplary Embodiment, wherein the granules have a Tumble Toughness Value of least 70 (in some embodiments, at least 75, 80, 85, 90, 95, 96, 97, 98, or even at least 99) before immersion in water and at least 50 (in some embodiments, at least 55, 60, 65, 70, 75, 80, 85 or even at least 90) after immersion in water at 20° C.±2° C. for two months.

13A. The plurality of granules of any preceding A Exemplary Embodiment, wherein the inorganic binder is present as at least 5 (in some embodiments, at least 10, 15, 20, 25, 30, 35, 40, or 45, or even up to 50; in some embodiments, in a range from 5 to 50, 10 to 50, or even 25 to 50) percent by weight of the shell of each granule, based on the total weight of the shell of the respective granule.

14A. The plurality of granules of any preceding A Exemplary Embodiment, wherein the granules have sizes in a range from 200 micrometers to 5 millimeters (in some embodiments, 200 micrometers to 2 millimeters, 300 micrometers to 1 millimeter, 400 micrometers to 1 millimeter; 500 micrometers to 2 millimeters; or even 1 millimeters to 5 millimeters).

15A. The plurality of granules of any preceding A Exemplary Embodiment, wherein the ceramic particles have an average size in a range from 200 nanometers to 200 micrometers (in some embodiments, 200 nanometers to 100 micrometers, 250 nanometers to 50 micrometers, 500 nanometers to 20 micrometers, 1 micrometers to 10 micrometers, or even 2 micrometers to 20 micrometers).

16A. The plurality of granules of any preceding A Exemplary Embodiment, wherein the ceramic particles have a bimodal distribution of sizes.

17A. The plurality of granules of any preceding A Exemplary Embodiment, wherein the inorganic binder is amorphous.

18A. The plurality of granules of any of Exemplary Embodiments 1A to 16A, wherein the inorganic binder is partially crystallized.

19A. The plurality of granules of any preceding A Exemplary Embodiment, wherein the alkali silicate is at least one of a cesium silicate, lithium silicate, a potassium silicate, or a sodium silicate.

20A. The plurality of granules of any preceding A Exemplary Embodiment, wherein the hardener is amorphous.

21A. The plurality of granules of any preceding A Exemplary Embodiment, wherein the hardener is at least one of an aluminum phosphate, an aluminosilicate, a cryolite, a calcium salt (e.g., $CaCl_2$)), or a calcium silicate.

22A. The plurality of granules of any preceding A Exemplary Embodiment, wherein the ceramic particles comprise at least one component with Total Solar Reflectance (as determined by the Total Solar Reflectance Test described in the Examples) of at least 0.7. Such exemplary ceramic particles include aluminum hydroxide, metal or metalloid oxide (e.g., silica (e.g., crystoballite, quartz, etc.), an aluminate (e.g., alumina, mullite, etc.), a titanate (e.g., titania), and zirconia), a silicate glass (e.g., soda-lime-silica glass, a borosilicate glass), porcelain, calcite, or marble.

23A. The plurality of granules of any preceding A Exemplary Embodiment, wherein the ceramic particles comprise mineral.

24A. The plurality of granules of any preceding A Exemplary Embodiment, wherein the granules further comprise at least one of a functional additive (e.g., rheology modifier (e.g., surfactant), durability modifier (e.g., nanosilica), and fluxing agent), organic binder, or pigment.

25A. The plurality of granules of any preceding A Exemplary Embodiment, wherein each respective granule has a density in a range from 0.5 $g/cm^3$ to 3.0 $g/cm^3$.

26A. The plurality of granules of any preceding A Exemplary Embodiment, wherein the granules are in at least one of the following shapes: cubes, truncated cubes, pyramids, truncated pyramids, triangles, tetrahedras, spheres, hemispheres, or cones.

27A. The plurality of granules of any preceding A Exemplary Embodiment, wherein each granule has a first face and a second face separated by a thickness.

28A. The plurality of granules of Exemplary Embodiment 27A, wherein at least some granules further comprise at least one of a straight or sloping wall.

29A. The plurality of granules of any preceding A Exemplary Embodiment, wherein the granules have a Stain Value not greater than 15 (in some embodiments, not greater than 10, 5, 4, 3, 2, 1, or even not greater than 0.5).

30A. The plurality of granules of any preceding A Exemplary Embodiment, further comprising at least one adhesion promoter.

31A. The plurality of granules of Exemplary Embodiment 30A, wherein the adhesion promotor comprises a polysiloxane.

32A. The plurality of granules of any preceding A Exemplary Embodiment, further comprising at least one dust suppressant.

33A. The plurality of granules of Exemplary Embodiment 32A, wherein the adhesion promotor comprises an acrylic polymer comprising a quaternary ammonium moiety and a nonionic monomer.

34A. The plurality of granules of any preceding A Exemplary Embodiment, wherein the shell comprises first and second concentric layers, with the first layer being closer to the core than the second layer.

35A. The plurality of granules of Exemplary Embodiment 34A, wherein the first layer has a thickness of at least 50 (in some embodiments, at least 75, 100, 150, 200, 250, 300, 350, 400, 500, or even 750; in some embodiments, in a range from 50 to 750, 100 to 500, or even 200 to 500) micrometers.

36A. The plurality of granules of either Exemplary Embodiment 34A or 35A, wherein the second layer has a thickness of at least 1 (in some embodiments, at least 2, 3, 4, 5, 10, 15, 20, 25, 50, 75, 100, 150, 200, 250, 300, 350, 400, 500, or even 750; in some embodiments, in a range from 1 to 750, 1 to 500, 1 to 250, 1 to 100, 50 to 750, 100 to 750, 200 to 750, 50 to 500, 100 to 500, or even 200 to 500) micrometer.

37A. The plurality of granules of any of Exemplary Embodiments 34A to 36A, wherein the first shell layer has a first specific surface area, wherein the second shell layer has a second specific surface area, and wherein the first specific surface area is greater than the second specific surface area (in some embodiments, the first specific surface area is at least 2 (in some embodiments, 3, 4, 5, or even at least 10) times greater than the second specific surface area).

38A. The plurality of granules of Exemplary Embodiment 37A, wherein the first surface area is not greater than 10 (in some embodiments, not greater than 9, 8, 7, 6, 5, 4, 3, or even not greater than 2; in some embodiments, in a range from 2 to 10, 3 to 10, 4 to 10, or even 5 to 10) m$^2$/grams.

39A. The plurality of granules of either Exemplary Embodiment 37A or 38A, wherein the second surface area is not greater than 2 (in some embodiments, not greater than 1.5, 1, 0.9, 0.8, 0.7, 0.6, 0.5, 0.4, 0.3, or not greater than 0.2; in some embodiments, in a range from 0.2 to 2, 0.3 to 2, 0.4 to 2, 0.5 to 2, or even 1 to 2) m$^2$/grams.

40A. A roofing material (e.g., a shingle) comprising the plurality of granules of any preceding A Exemplary Embodiment.

41A. A roofing material of Exemplary Embodiment 40A having a Total Solar Reflectance (TSR) (as determined by the Total Solar Reflectance Test described in the Examples) of at least 60 (in some embodiments, at least 63, 65, or even at least 70) %.

1B. A method of making the plurality of granules of any of Exemplary Embodiments 1A to 39A, the method comprising:

providing a plurality of ceramic cores;

coating each of the ceramic cores with a shell precursor, wherein the shell precursor comprises an aqueous dispersion comprising ceramic particles, alkali silicate precursor, and hardener precursor; and curing the coated aqueous dispersion to provide the plurality of granules.

2B. The method of Exemplary Embodiment 1B, wherein the ceramic cores include solid ceramic cores.

3B. The method of either Exemplary Embodiment 1B or 2B, wherein the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

4B. The method of any preceding B Exemplary Embodiment, wherein water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

5B. The method of any preceding B Exemplary Embodiment, wherein coating the ceramic core with the shell comprises fluidized bed coating.

6B. The method of Exemplary Embodiment 5B, wherein the fluidized bed coating comprises fluidizing ceramic cores, heating the bed of fluidized cores, and continuously feeding the aqueous dispersion into the fluidized bed.

7B. The method of Exemplary Embodiments 5B, wherein said feeding is over a period of time in a range from 5 minutes to 500 minutes.

8B. The method of Exemplary Embodiments 6B or 7B, wherein said heating is at a temperature in a range from 50° C. to 200° C.

Advantages and embodiments of this invention are further illustrated by the following examples, but the particular material and amounts thereof recited in these examples, as well as other conditions and details, should not be construed to unduly limit this invention. All parts and percentages are by weight unless otherwise indicated.

EXAMPLES

Materials

TABLE 1

| Material | Description | Source |
|---|---|---|
| "STAR" | Sodium silicate solution in water, wt. ratio SiO$_2$/Na$_2$O = 2.5 | PQ Corporation, Malvern, PA, under the trade designation "STAR" |
| "KSIL1" | Potassium silicate solution, wt. ratio SiO$_2$/K$_2$O = 2.5 | PQ Corporation, under the trade designation "KSIL1" |

TABLE 1-continued

| Material | Description | Source |
|---|---|---|
| "OPTIPOZZ" | Reactive metakaolin (anhydrous amorphous aluminosilicate) | Burgers Pigment Company, Sandersville, GA, under the trade designation "OPTIPOZZ" |
| "OPTIWHITE" | Mullite, filler, opacity provider anhydrous crystalline aluminosilicate | Burgers Pigment Company, under the trade designation "OPTIWHITE" |
| "CaCO3#10" | White calcium carbonate, filler, coarse | Imerys, Inc., Cockeysville, MD |
| "TiO$_2$ RCL9" | Pigment | Cristal Metals, Woodridge, IL |
| "MICRAL 632" | Aluminum trihydrate, milled, d50 = 3 micrometers | J. M. Huber Corporation, Edison, NJ |
| "BS 60" | Silicone resin emulsion | Wacker Chemical, Adrian, MI, under trade designation "SILRES BS 60" |
| "PSA57180 POLYMER" | Acrylate polymer and water | 3M Company, St. Paul, MN |

Methods

Method for Determining Reflectivity (Total Solar reflectivity (TSR))

The Examples were tested for reflectivity using a spectrum reflectometer (obtained as Model SSR-ER v6 from Devices and Services Co., Dallas, TX) using a 1.5E air mass setting. For "Cup" measurements, granules were loaded into a sample holder with a depth of about 5 mm. The surface of the granules was leveled using a roller.

Water Repellency Test

Water repellency test was performed by placing about 25.0 grams of treated granules into a 20-ml test tube, which was then inverted onto a flat surface, thereby forming a loose cone-shaped granule aggregate pile. A 15-mm diameter indent was then created by pressing the bottom of the test tube onto the tip of cone-shaped granule aggregate pile. Three to five drops of deionized water were placed into the indent, and time was recorded until the water disappeared.

Method for Determining Surface Specific Area

Surface specific area (SSA) of the granules correlates with staining—the higher the SSA the more the granules are prone to stain. Also, surface specific area of the granule affects the amount of post-treatment needed to achieve required hydrophobicity (water repellency). The Brunauer, Emmett, and Teller (BET) surface area and total pore volume were determined by $N_2$ adsorption. More specifically, samples were characterized by $N_2$ adsorption at 77° K using a gas sorption analyzer (obtained under the trade designation "MICROMERITICS;" Model ASAP-2020 from Micromeritics Instruments, Norcross, GA). Each specimen was outgassed for 24 hours at 573° K to remove any moisture or adsorbed contaminants that may have been present on the surface.

Examples 1-5 (EX1-EX5)

EX1-EX3 samples were prepared by applying a "base" coating layer on core mineral granules as follows: Grade #11 uncoated naturally occurring dacite mineral (available from 3M Company, St. Paul, MN) was screened 14 or 18 grade using −14 mesh or −18 mesh U.S. sieve, suspended in fluidized bed coater (obtained under the trade designation "GLATT GPCG-1 from Glatt, Weimar, Germany), and equilibrated at targeted temperature (25-30° C.) prior to application of coating slurry.

TABLE 2

| | Weight percent of material | | |
|---|---|---|---|
| U.S. Sieve Range | 11 grade | 14 grade | 18 grade |
| +8 | 0-0.1 | 0 | 0 |
| −8, +12 | 4-10 | 0-0.3 | 0-0.5 |
| −12, +16 | 30-50 | 0.5-15 | 0-6 |
| −16, +20 | 20-40 | 38-62 | 2-20 |
| −20, +30 | 10-30 | 23-38 | 40-80 |
| −30, +40 | 1-10 | 1-18 | 10-45 |
| −40 | 0-2 | 0-4 | 0-10 |

Slurries for coating were formulated using raw materials and formulations listed in Table 1 (above) and Table 3 (below), respectively.

TABLE 3

| | EX1 | EX2 | EX3 | EX4 | EX5 |
|---|---|---|---|---|---|
| Base Coat Components, wt. % | | | | | |
| "STAR" | 31.3 | 18.9 | 14.4 | 18.9 | 18.9 |
| "OPTIPOZZ" | 0 | 7.01 | 5.3 | 7.01 | 7.01 |
| "OPTIWHITE" | 16.4 | 15.8 | 6 | 15.8 | 15.8 |
| "CaCO3#10" | 0 | 15.8 | 21.4 | 15.8 | 15.8 |
| "MICRAL 632" | 16.4 | 0 | 0 | 0 | 0 |
| "TiO$_2$ RCL-9" | 4.7 | 4.51 | 0 | 4.51 | 4.51 |
| Water | 31.3 | 38 | 52.9 | 38 | 38 |
| Seal Coat Components, wt. % | | | | | |
| "KSIL1" | no seal coat applied | | | 30.1 | 29.1 |
| "OPTIWHITE" | | | | 12.1 | 11.6 |
| "OPTIPOZZ" | | | | 4.22 | 4.1 |
| "TiO$_2$ RCL-9" | | | | 0 | 3.9 |
| Water | | | | 53.6 | 51.3 |
| Post-Treatment Components, wt. % | | | | | |
| Water | | | 93 | | |
| "PSA57180 POLYMER" | | | 5.3 | | |
| "BS 60" | | | 1.8 | | |
| Rcup 450 C. @ maximum coating fraction (about 0.6-0.7) | 0.77 | 0.78 | 0.77 | 0.78 | 0.78 |
| Averaged BET SSA of whole granule, m$^2$/g | 32 | 3.5 | 2.5 | <1 | |
| Water repellency after post-treatment, min. | 0 | 0 | Not tested | >30 | |

The slurries were made generally as follows: First, structural filler ("ATH" or "CaCO3#10"), color extender ("OPTIWHITE") and pigment (TiO$_2$), if needed, were combined. Next, hardener ("OPTIPOZZ") was combined with liquid silicate ("STAR" or "KSIL1") and additional water and stirred vigorously for 10 minutes. Then, the dry powdered portion was combined with the liquid part and mixed via high shear using a Cowles blade at 500 rpm for at least 15 minutes. Slurry was maintained in suspension via continuous stirring while being pumped into fluidized bed coater.

In the coater, the slurry spray rate was kept as high as possible without accumulating moisture in the product bed. Product temperature was kept in the range 26-32° C., the atomizing pressure was 20-35 psi (138-241 kPa), the fluidizing air was 400-600 fpm (122-183 meters per minute), and the spray rate was 40-75 g/min. The fluidizing air was generally kept as low as possible while maintaining fluidized bed motion. Typical settings of batch fluid bed coater that was used are outlined in Table 4, below.

TABLE 4

| | |
|---|---|
| Solids starting charge, grams | 1000-1200 |
| Air velocity, mpm × 100 | 0.183-0.305 |
| Process Temp. setpoint, ° C. | 60-80 |
| Process Temp. reading, ° C. | 60-80 |
| Product Temp., ° C. | 25-30 |
| D/P across filter, range | 50-100 |
| D/P across material bed, range | 50-150 |
| R/H in exhaust air, range, % | 30-40 |
| Atomizing air pressure, kPa | 103-138 |
| Pump setpoint | 3.0-5.0 |
| Pump flow rate, timed, g/min. | 30-50 |
| Filter shaking on, y/n | y |

Figure 1A:
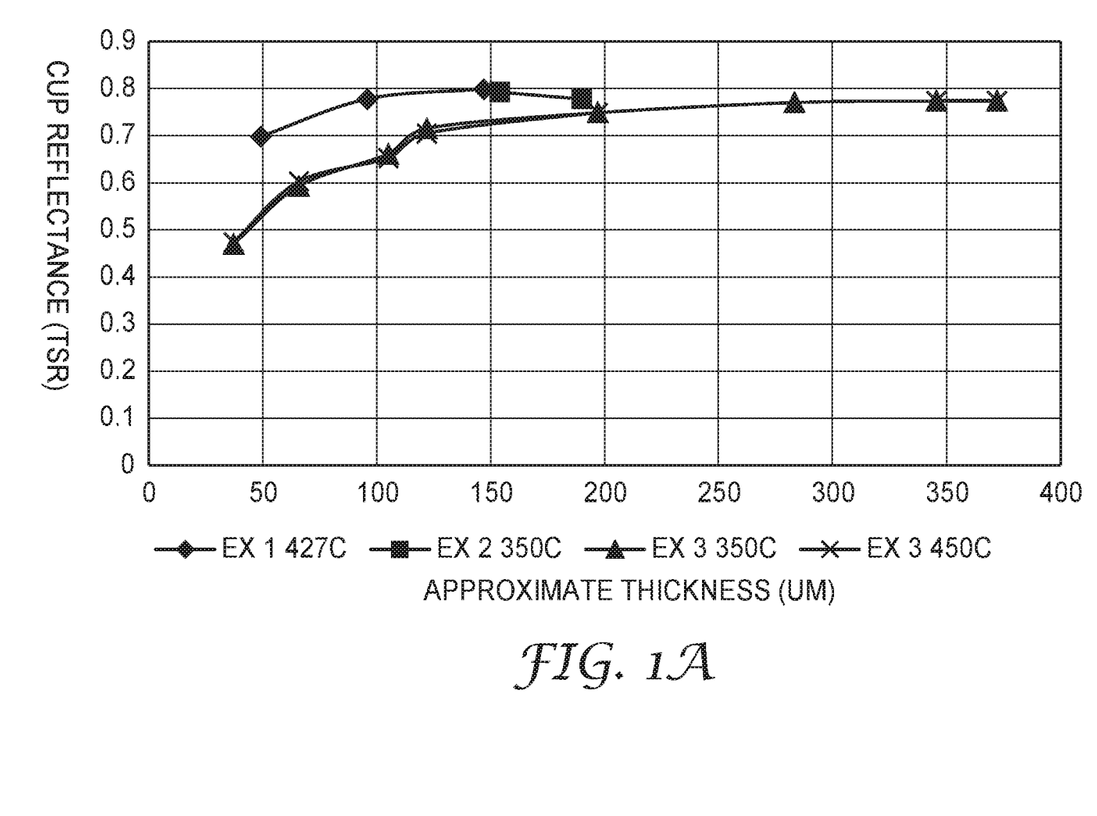
FIGS. 1A and 1B show TSR vs. coating thickness and TSR vs. coating fraction, respectively, for EX1-EX3 samples.
Figure 1B:
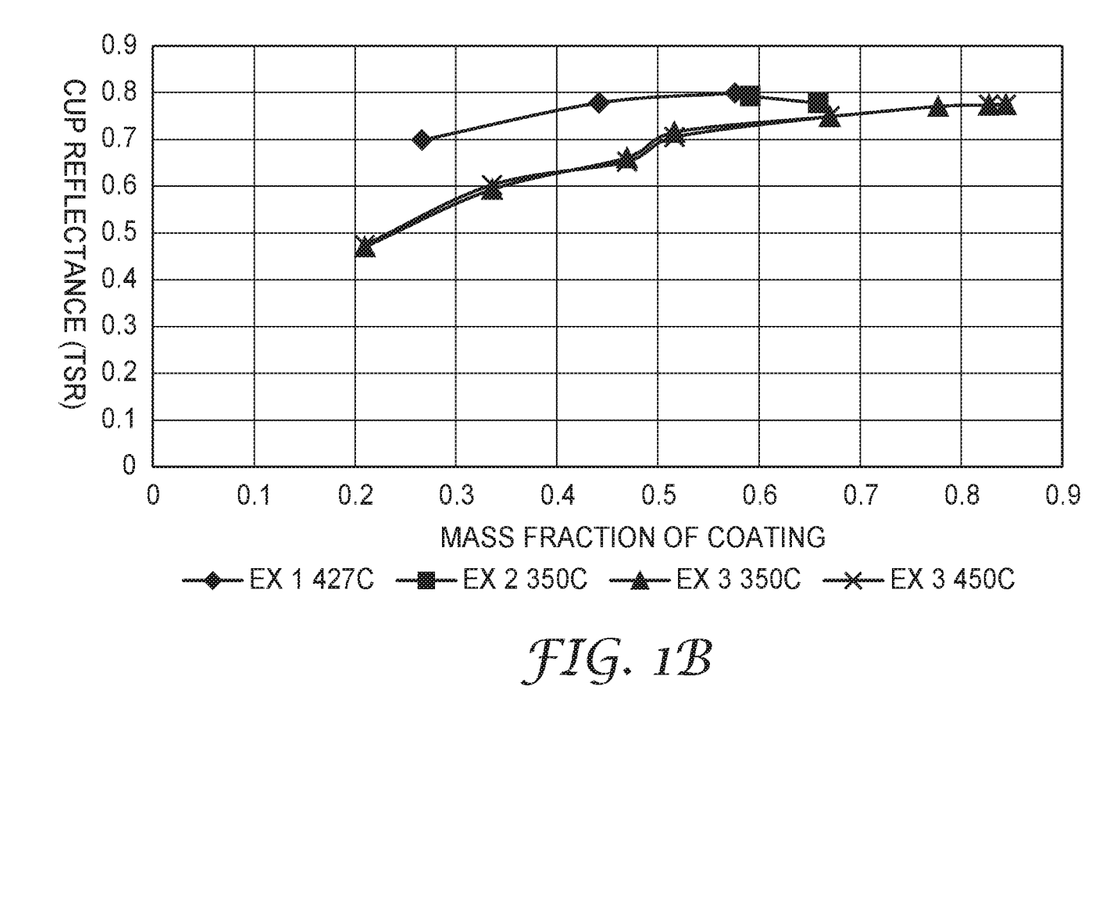

For a batch of 1-2 kg core granules, the coating process to form base coat of final thickness took about 1-2 hours. The final thickness (i.e., the "optimum optical thickness") was determined by plotting total solar reflectance (TSR) versus amount of coating (thickness in micrometers or amount of coating expressed as estimated weight fraction of coated granule). Once the graph of TSR versus amount of coating applied reaches a plateau, further increase in coating thickness was inexpedient for that combination of core granules and coating slurry composition. FIGS. 1A and 1B show TSR vs. coating thickness and TSR vs. coating fraction, respectively, for EX1-EX3 samples.

Figure 2A:
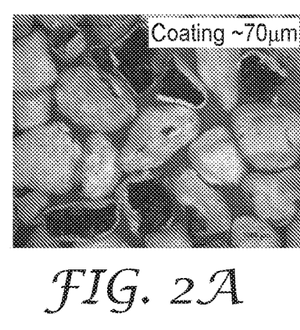
FIGS. 2A-2C show optical images of bright white core-shell granules of EX2.
Figure 2B:
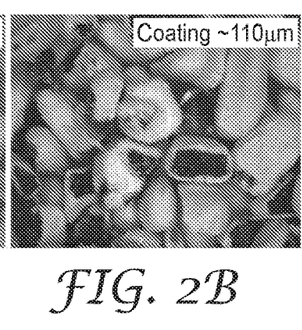
Figure 2C:
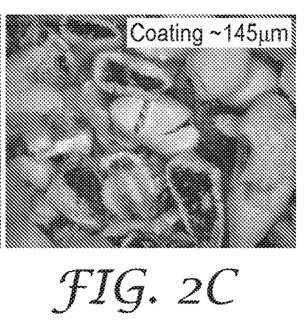

Final thickness of the base coating of EX1-EX3 ranged from 300 to 400 micrometers, which corresponded to about 50-70 wt. % of the whole granule construction. FIGS. 2A-C show optical images of bright white core-shell granules of EX2 (base coating thicknesses corresponding to a 0.2-0.3 coating fraction) at various stages of the coating process.

EX4 and EX5 represent granules of EX2 on which a "sealing" coating layer (of different composition from the base coating layer) was applied. The "sealing" layer was designed as a final thin coating (about 10-20 micrometers) which was applied on top of the base coating layer to decrease total surface area of the granule by eliminating open porosity and dust. Seal coat was applied in fluid bed coater as final coating with the following parameters of the run: product temperature was kept in the range 30-35° C., the atomizing pressure was 25 psi (172 kPa), the fluidizing air was 12-13 fpm (about 3.8 meters per minute), and the spray rate was 6-7 g/min.

Once the coating process was complete, granules were taken out of the coater and placed into a batch oven, where they were heated with heating rate of 2.5° C./min. up to 350° C. or 450° C. and subsequently cured at those temperatures for 3 hours.

Figure 2D:
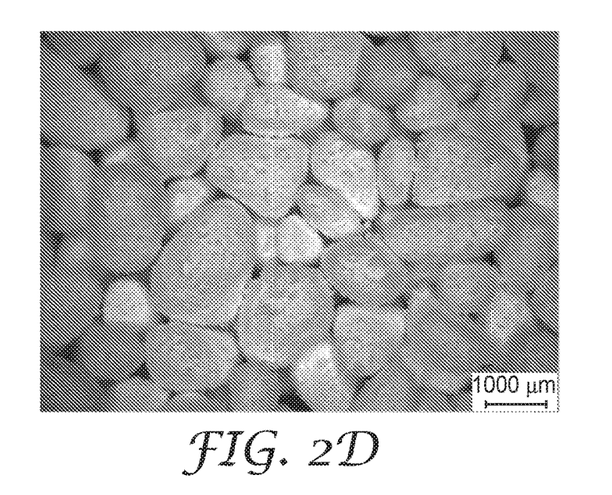
FIGS. 2D and 2E show optical images of bright white core-shell granules of EX5 before (i.e., EX2 granules) and after seal coating (i.e., EX5), respectively.
Figure 2E:
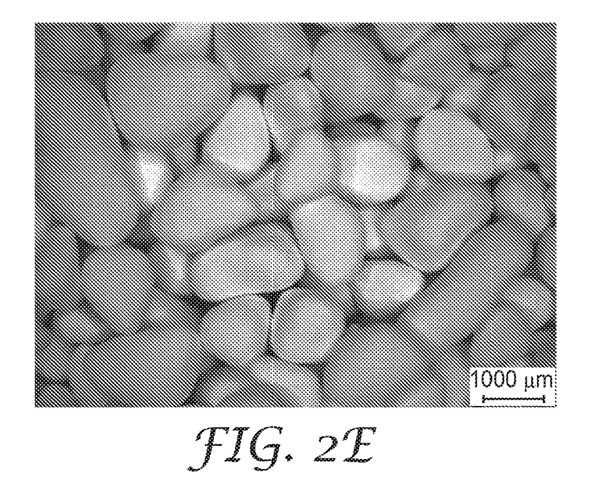

FIGS. 2D and 2E show optical images of bright white core-shell granules of EX5 before (i.e., EX2 granules) and after seal coating (i.e., EX5), respectively.

Heated granules were tested for cup brightness and BET surface specific area using methods described above.

After the heating step, the coated and cured granules were post treated with an adhesion promoting solution. The adhesion promoting solution (prepared using 15 grams of deionized water, 0.86 gram of acrylate polymer/water ("PSA57180 POLYMER"), and 0.3 gram of silicone resin emulsion ("BS 60") was applied (16 grams of solution per 1000 grams of granules) to the surfaces of the granules by mixing them in a 1-gallon (3.79 L) can on a paint shaker for 5 minutes. The post-treated granules were then tested for water repellency.

The results of all tests are summarized in Table 3, above.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A plurality of granules comprising a ceramic core having an outer surface and a shell on and surrounding the core, wherein the ceramic core comprises a naturally occurring silicate rock, wherein the shell comprises ceramic particles bound together with an inorganic binder, the inorganic binder comprising reaction product of at least alkali silicate and hardener, wherein the ceramic particles are present as greater than 50 percent by weight of the shell of the respective granule, based on the total weight of the shell of the respective granule, wherein the shell of each granule has a total porosity in a range from greater than 0 to 60 percent by volume, based on the total volume of the shell of the respective granule, wherein the shell of each granule has a volume of at least 40 volume percent, based on the total volume of the respective granule, and wherein the granules have a minimum Total Solar Reflectance of at least 0.7, wherein the ceramic core has no greater than 10 percent porosity, based on the total volume of the core.

2. The plurality of granules of claim 1, wherein the ceramic cores include solid ceramic cores.

3. The plurality of granules of claim 1, wherein the core has a diameter of at least 200 micrometers.

4. The plurality of granules of claim 1, wherein the shell has a thickness of at least 50 micrometers.

5. The plurality of granules of claim 1, wherein the ceramic particles of each granule comprise no more than 10 percent by weight pure TiO$_2$, based on the total weight of either the core or granule for the respective core or granule.

6. The plurality of granules of claim 1, wherein the ceramic particles of each granule comprise no more than 10 percent by weight pure Al$_2$O$_3$, based on the total weight of the granule for either the core or granule for the respective core or granule.

7. The plurality of granules of claim 1, wherein the granules have a Tumble Toughness Value of least 70 after immersion in water at 20° C.±2° C. for two months.

8. The plurality of granules of claim 1, wherein the hardener is amorphous.

9. The plurality of granules of claim 1, wherein the hardener is at least one of an aluminum phosphate, an aluminosilicate, a cryolite, a calcium salt, or a calcium silicate.

10. The plurality of granules of claim 1, wherein the ceramic particles comprise at least one component with Total Solar Reflectance of at least 0.7.

11. The plurality of granules of claim 1, wherein the ceramic particles comprise mineral.

12. The plurality of granules of claim 1, wherein the shell comprises first and second concentric layers, with the first layer being closer to the core than the second layer.

13. The plurality of granules of claim 12, wherein the first shell layer has a first specific surface area, wherein the second shell layer has a second specific surface area, and wherein the first specific surface area is greater than the second specific surface area.

14. The plurality of granules of claim 1, wherein the silicate rock is dacite, nepheline syenite, rhyolite, or andesite.

15. The plurality of granules of claim 1, wherein the ceramic core has no greater than 5 percent porosity, based on the total volume of the core.

16. A roofing material comprising a plurality of granules of claim 1 having a total solar reflectance of at least 70%.

17. A method of making the plurality of granules of claim 1, the method comprising:
  providing a plurality of ceramic cores;
  coating each of the ceramic cores with a shell precursor, wherein the shell precursor comprises an aqueous dispersion comprising ceramic particles, alkali silicate precursor, and hardener precursor; and
  curing the coated aqueous dispersion to provide the plurality of granules.

18. The method of claim 17, wherein the coating the ceramic core with the shell comprises fluidized bed coating.

* * * * *